May 2, 1944. H. H. FEBREY 2,347,897
ELECTRICAL SHUNT FOR PIPE COUPLINGS
Filed Aug. 27, 1941
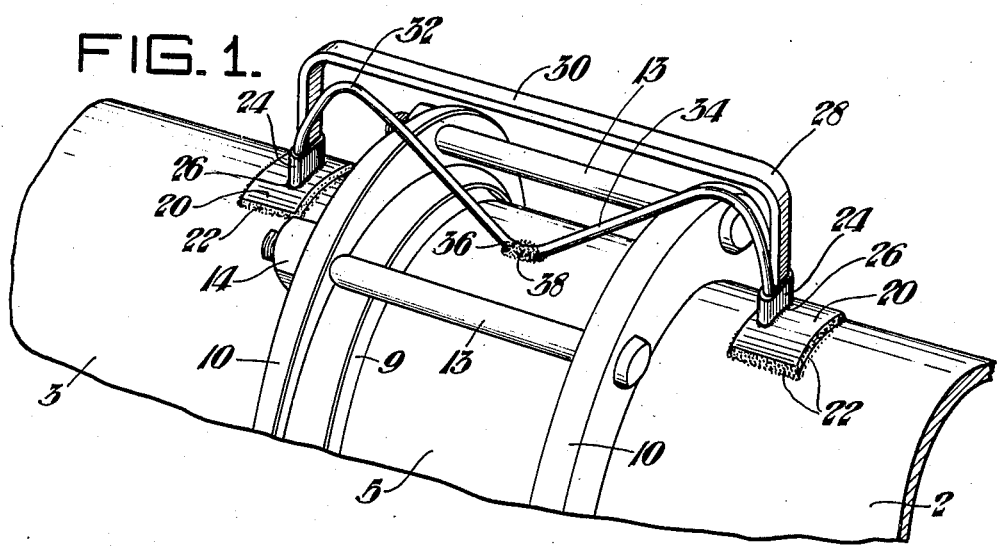
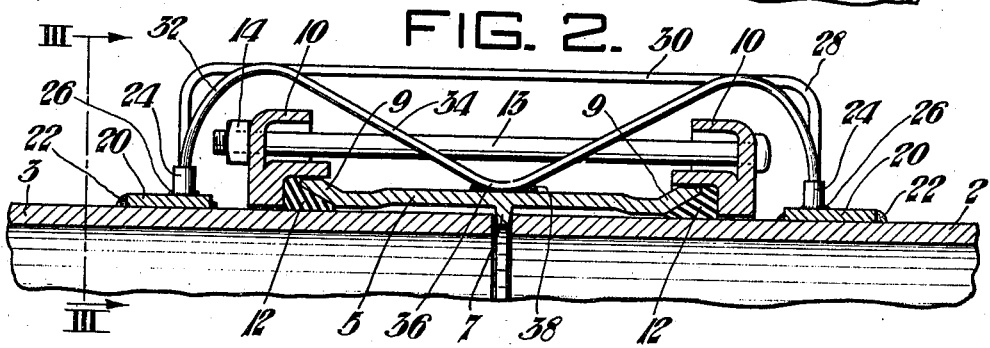
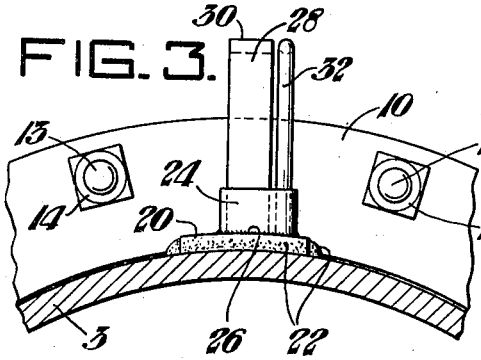
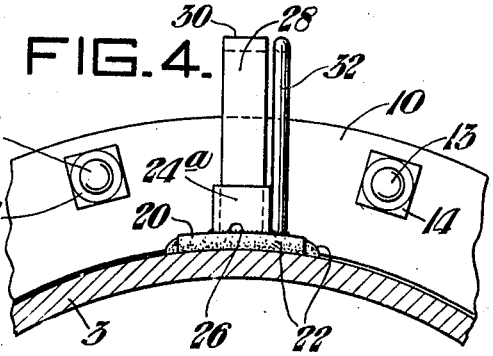
Inventor:
HAROLD H. FEBREY,
by John E. Jackson
His Attorney.

Patented May 2, 1944

2,347,897

UNITED STATES PATENT OFFICE 2,347,897

ELECTRICAL SHUNT FOR PIPE COUPLINGS

Harold H. Febrey, South Orange, N. J., assignor to The American Steel and Wire Company of New Jersey, a corporation of New Jersey Application August 27, 1941, Serial No. 408,511

3 Claims. (Cl. 173—326)

This invention relates to electrical shunts for pipe couplings such as are used to provide the coupling with the same potential as the pipe, to thereby eliminate local electrolytic corrosion.

In the art of pipe couplings, and particularly those which are used on natural gas pipe lines, there is in extensive use a type of coupling which, briefly stated, comprises a short metallic sleeve or middle ring which telescopes over the aligned ends of the pipe, a follower ring disposed at each end of the short sleeve or middle ring, and a rubber gasket which fits into each of the follower rings at the end of the short sleeve or middle ring, together with metallic bolts which extend between the follower rings and draw the same together, thus forcing the rubber gasket in between the pipe and the sleeve or middle ring. The middle ring in most cases makes very poor electrical contact with the pipe; and it may even make no contact whatever. This situation is very troublesome, particularly in great lengths of pipe line which have high electrical resistance, as it is necessary to keep the lengths of pipe at the same potential if cathodic protection is to be secured.

I am aware of numerous attempts to electrically shunt the ends of pipes, including those forming pipe lines which are buried in the ground.

These electrical shunts of the prior art have been made in shops or in the field from solid copper rods or copper bus-bars varying in width according to the desired cross-section. Different methods of attachment between the adjoining ends of the pipe have been tried, such as soldering, brazing, and arc welding. Whenever the copper of the rod or bus-bar is attached directly to the adjoining ends of the pipe, it is necessary to use non-ferrous welding rods where the arc welding method is employed. In a few instances steel electrode arc welding has been employed, the terminals consisting of sections of scrap pipe. The copper rod or bus-bar has been laid flat on top of the sections of scrap pipe, and arc welded or brazed thereto. Such shunts are expensive to make in the field, and are very clumsy.

In the majority of cases, the pipe lines are buried in the ground, and in order to accomplish the desired bonding it is necessary to excavate a hole sufficiently large to accommodate a workman. Arc welding is, of course, the most desirable method of accomplishing the bonding, although oxyacetylene flame welding has been used to some extent. The latter method is less desirable because of the danger of injuriously heating the rubber gaskets of the coupling. In the case of oxyacetylene flame welding, the terminals have to be spaced considerably further from the coupling, thereby increasing the length of the shunt.

Where a copper conductor is attached directly to the adjacent ends of the pipe, it is necessary to use a non-ferrous electrode. This results in the production of fumes that are very poisonous and make the workmen ill. Due to the fact that the workmen are in a hole where it is impossible to avoid the fumes when it has been desirable to use this process, it is absolutely necessary in some cases that the workmen wear gas masks, which in warm weather are almost impossible to use. If gas masks are not employed, a fan must be used to keep the fumes away from the workmen. In steel electrode arc welding, this condition does not exist.

A peculiar characteristic of arc welding is that steel can be welded to steel or copper to steel with copper or copper-alloy welding rods, but a copper terminal cannot be welded to a steel pipe with a steel electrode. The device of the present invention accordingly utilizes an auxiliary conductor made with steel wire, to thereby provide a means of attachment to the steel middle ring or sleeve of the coupling with a steel electrode. The steel middle ring carries practically no current, and therefore it is only necessary to bring its potential up to that of the pipes.

It is among the objects of the present invention to eliminate local electrolytic corrosion in pipe couplings of the type described hereinbefore.

Another object is to provide an electrical shunt for the purpose specified, which may be easily and inexpensively used.

Still another object is the provision of a device of the class described which is very durable in service.

A further object is to provide an electrical shunt having the foregoing advantages and one which is also characterized by being susceptible of application with either oxyacetylene, flame, or arc welding.

The foregoing and other objects will be more apparent after referring to the following specification and attached drawing, in which:

Figure 1 is a perspective of the device of the present invention.

Figure 2 is a fragmentary sectional elevation through a part of the device.

Figure 3 is a sectional view on the line III—III of Figure 2.

Figure 4 is a view similar to Figure 3, but disclosing a modification.

Referring more particularly to the drawing, the numerals 2 and 3 designate a pair of pipes which are disposed in proximate and aligned relationship.

In accordance with prior art practices, such pipes are frequently joined by a group of instrumentalities comprising a metallic sleeve 5 which extends over the aligned ends of the pipes 2 and 3 and provides an intermediate interiorly disposed annular rib 7 which fits between the ends of the pipes. The sleeve 5 has its edges upwardly flared, as designated at 9, and each of the pipes 2 and 3 carries an annular follower ring 10 having a recess 11 for the reception of one of the flared edges 9 of the sleeve 5, together with a gasket 12. The follower rings 10 are clamped together by means of bolts and nuts 13 and 14, whereby a seal is provided at each end of the sleeve 5.

As stated hereinbefore, joints of this type, which are frequently used on natural gas pipe lines, give trouble because of susceptibility to local electrolytic corrosion.

It is old in the art to apply electrical shunts between the ends of pipes embodying couplings of the type referred to, in order to keep great lengths thereof at the same potential, but it has been found that merely establishing a bond across the ends of such pipes is of itself insufficient.

According to the teachings of the present invention, there is provided at the adjacent ends of the pipes 2 and 3 a small steel plate 20 which is curved to conform to the contour of the said pipes. Each of the plates 20 is welded to one of the steel pipes around its edges, as designated at 22, and with the use of a steel electrode. A short right-angularly-extending rectangular-shaped steel sleeve 24 is welded around its edges to each of the plates 20, as shown at 26. Disposed to extend into each of the sleeves 24 is a rectangular copper bar 28 which extends at right angles with respect to the axis of the pipes 2 and 3, these rectangular copper bars being connected at their ends remote from the sleeves 24 by an integrally formed bar 30 of the same material and section. According to this construction, the unit composed of the bars 28 and intermediate integrally formed connecting bar 30 accomplishes two purposes: (1) the over-all length of the shunt formed thereby is kept at a minimum; and (2) the use of the steel sleeves 24 at the ends of the bars 28 permits the copper of the material thereof to be kept remotely with respect to the pipes 2 and 3 and all of the component parts of the coupling. It has been found that if a copper shunt is laid in contact with and parallel to the steel of the pipes 2 and 3 and the coupling, local currents are set up and corrosion takes place. By the use of the design described hereinbefore, this is eliminated.

Into each of the steel sleeves 24 there is disposed a steel rod 32 which extends out of the same in a substantially straight manner. These steel rods 32 are joined at their outer ends by an integrally formed connecting bar 34 of the same material and section, the latter being bent intermediate its ends to a substantially sharp point 36 which is held in contact with, and welded to, the exterior of the sleeve 5 of the coupling, as shown at 38.

Referring more particularly to Figure 4, I have disclosed a modification which comprises the provision of a galvanized steel sleeve 24ª which is so constructed as to accommodate only the end of one of the bars 28, thereby permitting the end of the steel rod 32 to be welded directly to the steel terminal plate 20. This construction can be embodied on either or both ends of the electrical shunt of the present invention.

While I have shown and described several specific embodiments of the present invention, it will be seen that I do not wish to be limited exactly thereto, since various modifications may be made without departing from the scope of the invention as defined in the appended claims.

I claim:

1. The combination of a pair of ferrous metal pipes and a ferrous metal coupling therefor, of a non-ferrous metal electrical shunt bridging the said pipes, and a ferrous metal electrical connection between at least one of the said pipes and the coupling therefor.

2. The combination of a pair of ferrous metal pipes and a ferrous metal coupling therefor, of a non-ferrous metal electrical shunt bridging the said pipes, and a ferrous metal electrical connection between each of the said pipes and the coupling therefor.

3. The combination of a pair of ferrous metal pipes and a ferrous metal coupling therefor, a ferrous metal member connected to each of said pipes, a non-ferrous metal member connecting said ferrous metal members, and a ferrous metal electrical connection between said ferrous metal members and said ferrous metal coupling.

HAROLD H. FEBREY.